United States Patent [19]

Hatwar et al.

[11] Patent Number: 5,783,301

[45] Date of Patent: *Jul. 21, 1998

[54] MULTILAYER MAGNETOOPTIC RECORDING MEDIA

[75] Inventors: Tukaram K. Hatwar, Penfield; Yuan-Sheng Tyan, Webster, both of N.Y.

[73] Assignee: Eastman Kodak Company, Rochester, N.Y.

[*] Notice: The term of this patent shall not extend beyond the expiration date of Pat. No. 5,563,000.

[21] Appl. No.: 741,416

[22] Filed: Oct. 29, 1996

[51] Int. Cl.⁶ .................. G11B 5/66; G11B 5/70; G11B 5/716; G11B 11/00
[52] U.S. Cl. .................. 428/332; 428/694 SC; 428/694 ML; 369/13
[58] Field of Search .......... 369/13; 428/694 ML, 428/694 SC, 694 MT, 694 AH, 694 MM, 694 IS, 694 MP, 694 EC, 332

[56] References Cited

U.S. PATENT DOCUMENTS

| | | | |
|---|---|---|---|
| 5,192,626 | 3/1993 | Sekiya et al. | 428/694 ML |
| 5,436,072 | 7/1995 | Hatwar et al. | 478/336 |
| 5,563,000 | 10/1996 | Hatwar et al. | 428/694 ML |
| 5,565,266 | 10/1996 | Hatwar et al. | 428/332 |
| 5,660,930 | 8/1997 | Bertero et al. | 428/332 |

Primary Examiner—John J. Zimmerman
Assistant Examiner—Michael LaVilla
Attorney, Agent, or Firm—Raymond L. Owens

[57] ABSTRACT

A magnetooptical recording medium is described having a substrate, a seed layer structure having at least two layers including a first layer formed on the substrate and having amorphous ITO and having a thickness of greater than 20 nm but less than 200 nm; and a polycrystalline metal layer formed directly on the first layer having a thickness of 0.2-3.2 nm. The recording medium further includes a recording multilayer of alternate layers of platinum and cobalt or palladium and cobalt alloy deposited onto the said seed layer structure, whereby the said seed layer structure is selected to improve the coercivity and squareness of the recording multilayer.

7 Claims, 7 Drawing Sheets

MULTILAYER MAGNETOOPTIC RECORDING MEDIA

FIELD OF THE INVENTION

This invention relates to magnetooptical (MO) recording media having a platinum/cobalt (Pt/Co) or palladium/cobalt (Pd/Co) multilayered structure.

BACKGROUND OF THE INVENTION

Reference is made to commonly assigned U.S. patent application Ser. No. 08/674,226, filed Jun. 28, 1996, entitled "Multilayer Magnetooptic Recording Media" to Tukaram K. Hatwar, Yuan-Sheng Tyan, and Charles F. Brucker. The disclosure of this related application is incorporated herein by reference.

Pt/Co multilayers have been used for MO recording media. These materials have perpendicular magnetic anisotropy, large Kerr rotation at short wavelength and excellent environmental stability. However, these materials when deposited by conventional sputtering processes possess low coercivity. Attempts have been made to increase the coercivity by controlling the Co/Pt ratio, using seed layers of metals and dielectrics, and etching the substrate before depositing the multilayer (see Magnetooptic Recording Medium, European Patent Application 0304873 (1988)); Perpendicular Magnetic Recording Media, European Patent Application 0304927 (1989); U.S. Pat. No. 5,082,749; and "Dielectric Enhancement Layers for a Co/Pt Multilayer Magnetooptic Recording Medium", Carcia et al, Appl. Phys Lett. 58 (1991), pages 191–193. For high Co/Pt ratio, even though coercivity up to 1000 Oe can be obtained, the hysteresis loops are not square. For through substrate recording, the use of a metal seed layer is objectionable since it attenuates the Kerr rotation, decreases the figure of merit and decreases the recording sensitivity.

Carcia et al, supra, reported improvement in coercivity in Co/Pt multilayers using layers of crystalline $In_2O_3$ and ZnO. To achieve desired squareness, noise level and carrier to noise ratio, Carcia et al used an additional step of sputter etching the dielectric surface. Etching adds to the production costs. Carcia et al emphasized the use of crystalline underlayers in combination with Co/Pt multilayers which are also crystalline. Carcia et al also reported that some of the most commonly used dielectric materials such as $Si_3N_4$, $TiO_2$, $Nb_2O_5$ and ZnS, were ineffective in changing the coercivity.

It has been noted in the Carcia et al reference, that the 100 nm thick seed layer of $In_2O_3$ with 4% Sn enhanced the coercivity of the Co/Pt multilayer. However, no particulars were discussed with respect to the seed layer. This material prepared by Carcia et al is crystalline as per the reference RCA Review, Vol. 32, pg. 7 (1971) and U.S. Pat. No. 5,192,626.

It is believed that high crystallinity of the seed layer was required to improve the texture and growth of Co/Pt multilayer structure. However, high crystallinity give rise to noise during recording process.

In the above-identified U.S. patent application Ser. No. 076,604, now U.S. Pat. No. 5,565,266, an amorphous seed layer is used which has a thickness of less than 20 nm. In U.S. Ser. No. 316,743, now U.S. Pat. No. 5,563,000 a duplex seed layer with less than 20 nm amorphous ITO and a metal layer is disclosed. Both of these seed layer structures provide a number of advantages but do not provide a significant Kerr rotation enhancement and reflectivity adjustment.

SUMMARY OF THE INVENTION

It is therefore an object of the present invention to provide an improved magneto optic media structure having a Co/Pt multilayer with not only increased coercivity and squareness but also improved Kerr rotation, and lower reflectivity and recording sensitivity.

The above object is achieved by a magnetooptical recording medium comprising a substrate, a seed layer structure having at least two layers including a first layer formed on the substrate and having amorphous ITO and having a thickness of greater than 20 nm but less than 200 nm; and a polycrystalline metal layer formed directly on the first layer having a thickness of 0.2–3.2 nm and a recording multilayer of alternate layers of platinum and cobalt or palladium and cobalt alloy deposited onto the said seed layer structure, whereby the said seed layer structure is selected to improve the coercivity and squareness of the recording multilayer.

The following are advantages of magnetooptic media made in accordance with this invention:

a) these seed layers enhance the coercivity and squareness of the Kerr hysteresis loop;

b) these seed layers reduce the writing noise, increase the carrier and hence the general performance of the MO structure;

(c) the present invention provides a structure with not only improved squareness and coercivity, but also improved Kerr rotation, lower reflectivity, and high writing sensitivity;

d) the duplex seed layer provides increased perpendicular anisotropy and coercivity of the Co/Pt superlattice;

e) when incorporated into a disk, the present invention provides increased in-track uniformity;

f) a duplex layer functions better than a single layer of ITO, or Pt metal; and g) magnetooptic structures made in accordance with this invention are particularly suitable for applications using short wavelength lasers.

DETAILED DESCRIPTION OF THE INVENTION

Figure 1:
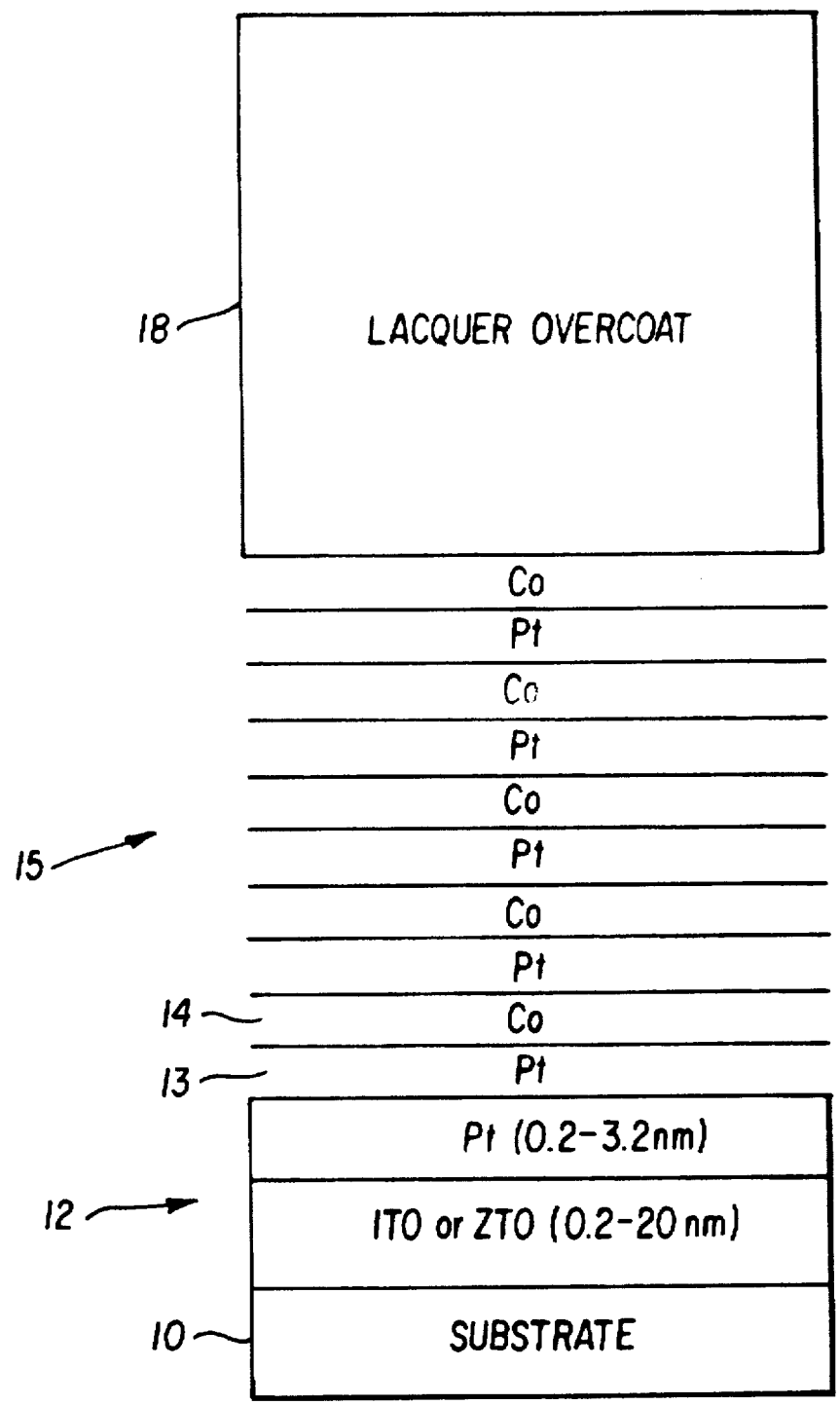
FIG. 1 shows magneto-optic recording structures including a seed layer in accordance with the invention.

Whenever the term amorphous is used it means a disordered structure in which present detection means such as x-ray diffraction cannot detect substantially any crystallinity. Turning first to FIG. 1, a schematic shows a structure in accordance with the invention. The device includes a substrate 10 which is made, for example, of polycarbonate or glass and a duplex seed layer 12 made of an amorphous ITO layer 12A formed on the substrate 10 and a polycrystalline metal layer 12B such as Pt metal formed on the ITO layer.

It will be understood that this seed layer can have various combinations of materials as will be described hereinafter and still operate in accordance with the invention. On the duplex seed layer 12 is deposited a multilayer recording element 15 having alternating bilayers of Pt 13 and Co 14. It has been found to be preferable to start with a Pt layer 13 on the duplex seed layer 12. In FIG. 1, the metal layer 12B of the duplex seed layer is Pt and the first alternate layer of the multilayer recording element 15 is also Pt. Generally the substrate is transparent as light from a laser or other source will illuminate a recording multilayer structure through the substrate. The thickness of Co and Pt were 0.2–0.8 nm and 0.4–1.8 nm, respectively, and the number of bilayers was 3–23. A pair of adjacent layers of Pt and Co is often referred to in the art as a bilayer.

The ITO layer 12A, in accordance with the invention, is formed of indium oxide ($In_2O_3$) and tin oxide ($SnO_2$). This layer is amorphous in structure and provides a number of advantages. The thickness of this layer preferably is greater than 20 nm but should be less than 200 nm. We found that the ITO layer thicknesses between 20–200 nm are adequate to maintain desired reflectance and Kerr rotation of the Co/Pt multilayer.

The metal top layer 12B of the duplex seed layer 12 is a polycrystalline thin metal layer whose crystalline structure matches closely with the face centered cubic (fcc) structure of the Co/Pt superlattices. Such metal layer is selected from the group consisting Pt, Au, and Pd, although Pt is preferable. Other metals such as Ir, Co, Ag, Bi, Sb, and Pb were tested but performed less satisfactorily.

Figure 2:
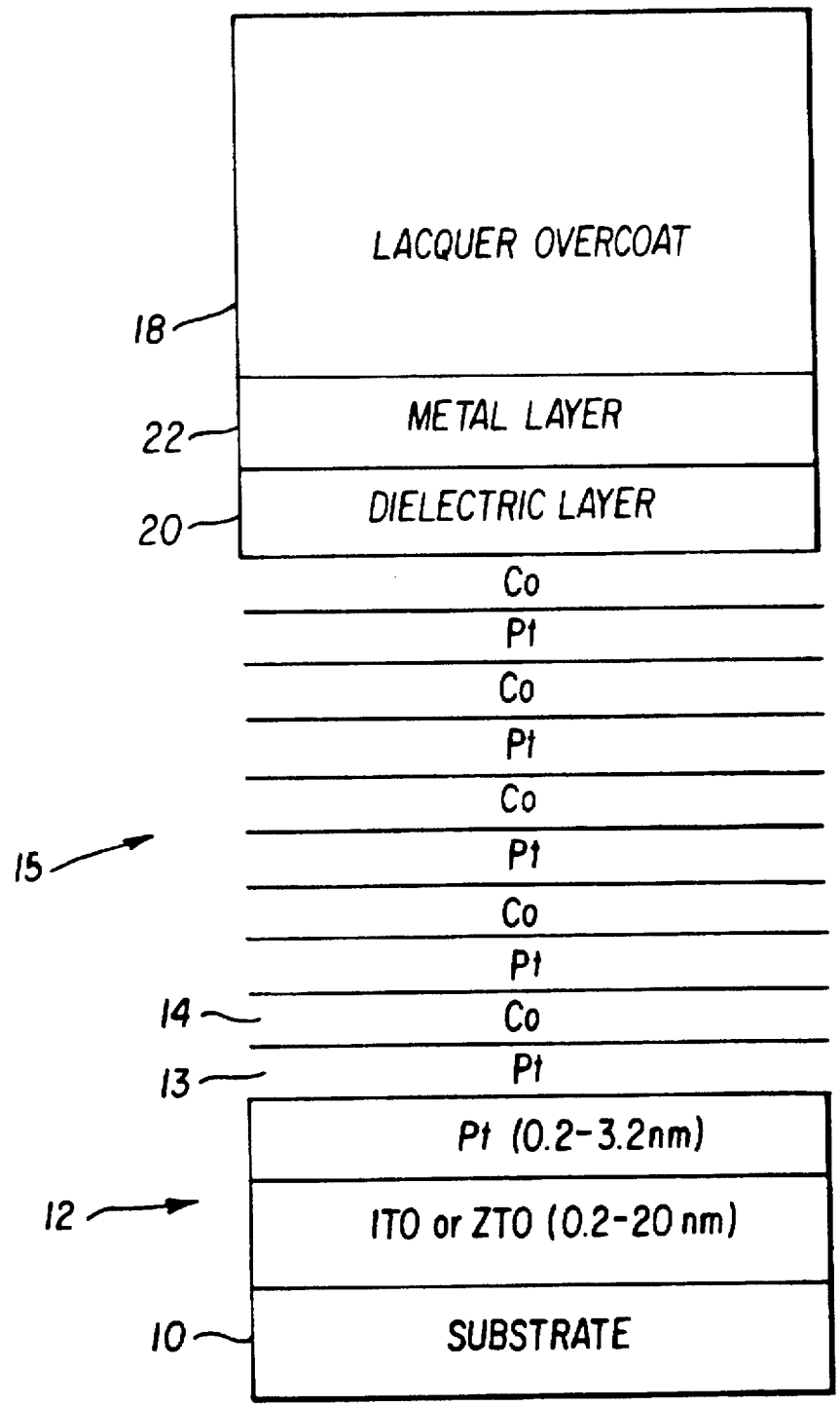
FIG. 2 shows an expanded version of a magnetooptic recording structure similar to FIG. 1 but with additional layers of dielectric and a metal.

In FIG. 2, a different structure is shown where layers correspond to those in FIG. 1, the same numbers will be used. This structure is different from FIG. 2 in that there is a dielectric layer 20 formed directly on the multilayer recording element 15. This layer may be selected to be the same material as the seed layer or some other material. Its function is to thermally insulate the lacquer layer from the recording multilayer. It also can be selected to provide an optical enhancement function if the media is illuminated by light passing through it (front surface recording). An optional metal layer 22 is formed, for example, of a reflective material such as of aluminum, gold, silver, copper or platinum can be disposed directly on the dielectric layer 20. The UV-curable lacquer overcoat layer 18 is formed on the metal layer 22. This lacquer overcoat layer 18 is scratch resistant and maintains structural integrity of the media.

Alternatively, a double-sided construction can be utilized wherein two substrates coated with seed layers and the platinum/cobalt multilayers are laminated together using adhesives. Yet another alternative is to form an air-sandwich structure while a small air gap is maintained between them.

These structures are particularly suitable for use in magnetooptic disk, compact disk (CD) and photo compact disk (Photo CD). Alternatively, a blank disk can be used in an air-sandwich structure with a magnetooptical recording medium in accordance with the invention. Magnetooptical recording medium structures in accordance with this invention can be provided in the form of a disk which can be used in a cartridge.

With this type of structure, incident laser light illuminates a particular portion of the substrate, passes through the substrate, and interacts with the multilayered structure changing the Kerr rotation.

EXAMPLES

Thin structures of $In_2O_3$, $SnO_2$ and indium-tin oxide (ITO) were prepared by d.c. sputtering a homogenous target in Ar (or Kr) and Ar+$O_2$ (or Kr+$O_2$) atmosphere. Targets of varying amounts of $In_2O_3$ and $SnO_2$ prepared by hot-press method were used to obtain structures of various ITO compositions. Structures were deposited on glass and Si substrates. These structures were optically transparent in the 300–900 nm wavelength region, have high index of refraction and low extinction coefficient. The crystallinity of $(In_2O_3)1-x(SnO_2)x$ (x=0.0–1.0) structures was analyzed by x-ray diffraction and found to vary with the sputtering gas used and the deposition conditions. $In_2O_3$ structure was found to be crystalline whereas $SnO_2$ structure was amorphous. With increasing amount of $SnO_2$ (i.e. x component) the crystallinity of ITO decreases. ITO with 10–20% $SnO_2$ was crystalline but less so than the $In_2O_3$ film. With further increase in $SnO_2$ content, the film becomes less crystalline (amorphous-like). Finally, ITO films with greater than 50% $SnO_2$ were completely amorphous.

The Pt/CO multilayers were prepared by d.c. sputtering Pt and Co targets in Ar, Kr or Xe atmosphere. The base pressure before depositing the structures was about 1×10–5 Torr and deposition pressure was about 10–40 mTorr. Alternate layers of Pt and Co were deposited onto the substrate spinning over the Pt and Co targets. The thickness of each layer was controlled by controlling the deposition rate and the substrate rotation speed.

Figure 3A:
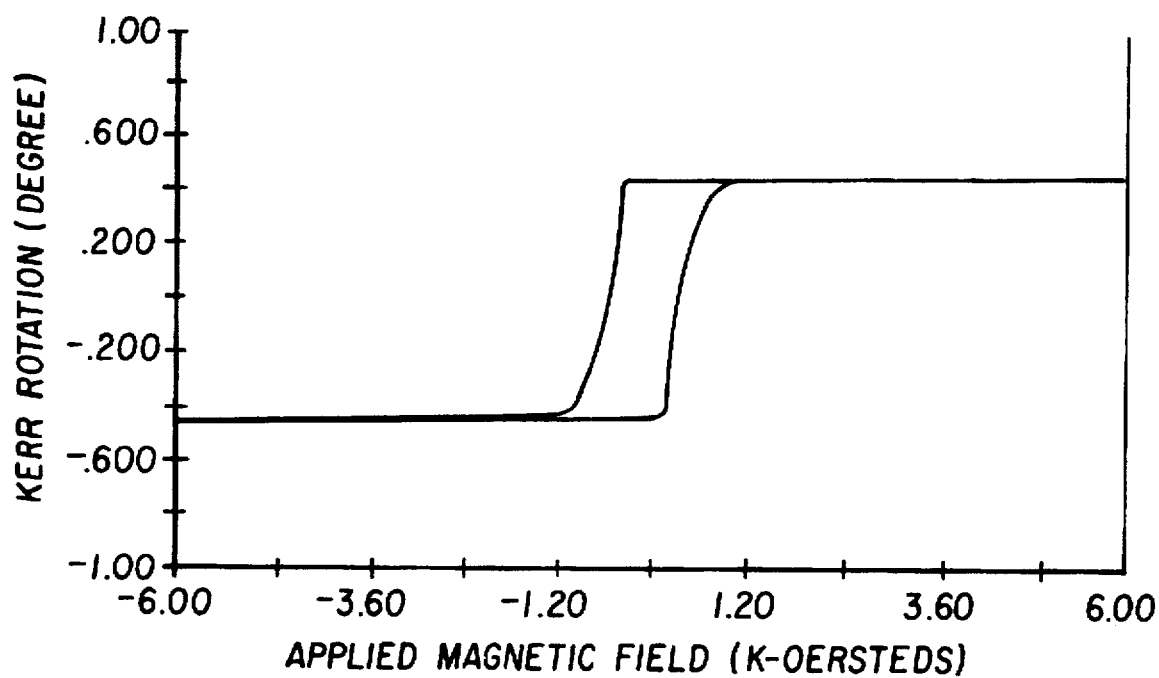
FIG. 3A shows a Kerr hysteresis loop plot without using a seed layer.

With reference to FIG. 3A, a Pt/Co multilayer structure with twelve bilayers was deposited on a 5.25" dia. glass substrate using 40 mT Kr gas. The thickness of the individual Pt and Co layers were 0.25 nm and 0.8 nm respectively. Coercivity and the Kerr rotation were 421 Oe and 0.45 degree, respectively.

Figure 3B:
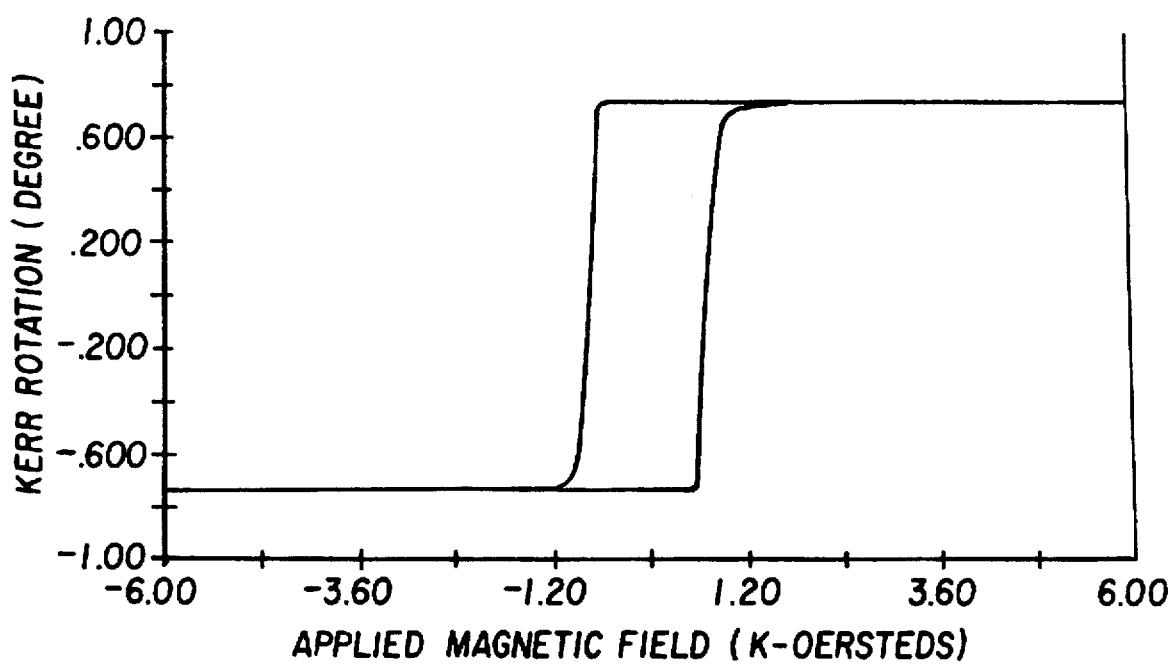
FIG. 3B shows a plot similar to FIG. 3A but with a 30 nm ITO seed layer.

Another sample was prepared under the same conditions first by sputter depositing a 40 nm amorphous seed layer of $(In_2O_3)50(SnO_2)50$ using 3 mT Ar sputtering pressure and then the twelve bilayers of the same composition Co/Pt multilayer structure. The Kerr loop of this structure is shown in FIG. 3B. The Co/Pt multilayer structure deposited on ITO seed layer has substantially larger coercivity and Kerr rotation (Hc=750 Oe and k=0.74 degree) than that sputtered directly on the substrate. Also the squareness of the Kerr loop is improved.

Figure 3C:
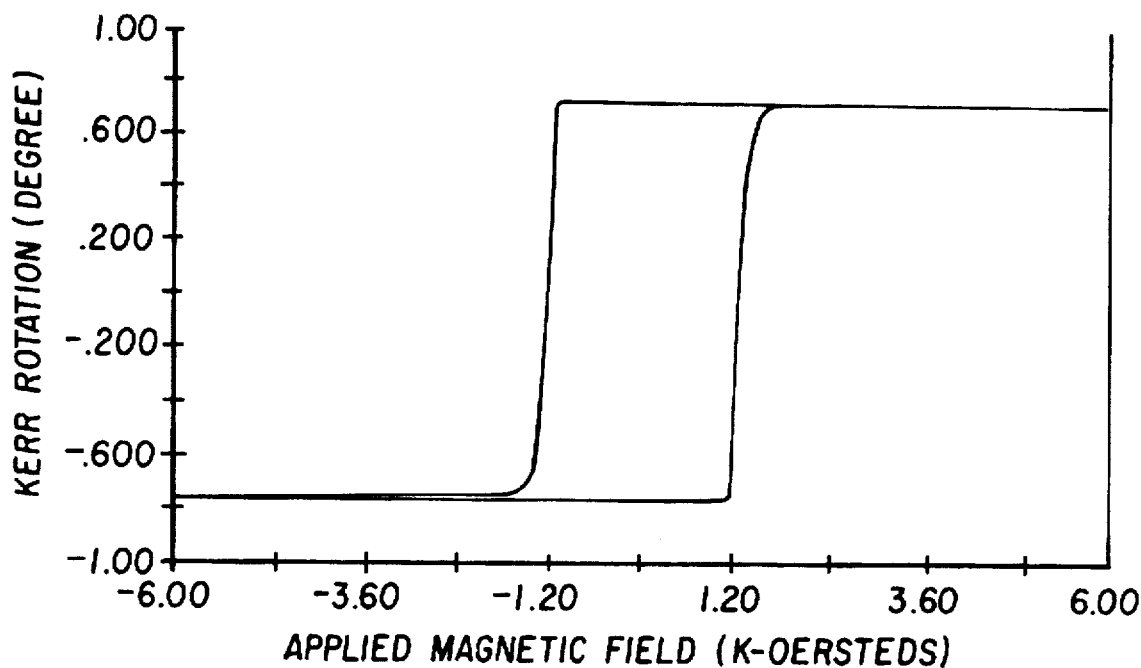
FIG. 3C shows a plot similar to FIG. 3B but with a duplex seed layer made of 30 nm ITO seed and 0.8 nm Pt layer.

Turning now to FIG. 3C, we see the Kerr hysteresis loops of a Pt/Co multilayer using a duplex seed layer. The bottom layer of the duplex seed layer is provided by 40 nm amorphous ITO and the top metal layer is 0.8 nm Pt metal. The top metal layer can be selected from the group consisting of Pt, Au, Pd. These metals are polycrystalline and have fcc structure which is similar to that of Co/Pt multilayer. As shown in FIG. 3C, using Pt as the metal layer, the Kerr hysteresis loop was dramatically improved. The Kerr loop was quite square and had a 0.74 degree Kerr rotation but much larger coercivity greater than 1300 Oe as compared to that using ITO seed only. Thus, both the Kerr rotation and coercivity can be improved using duplex seed layers of this invention. The other metals also exhibited square Kerr hysteresis loop but coercivity was highest using Pt layer. Other metals, such as Ir, Co, Ag, Bi, Sb, and Pb, were tested but performed less satisfactorily.

Figure 4:
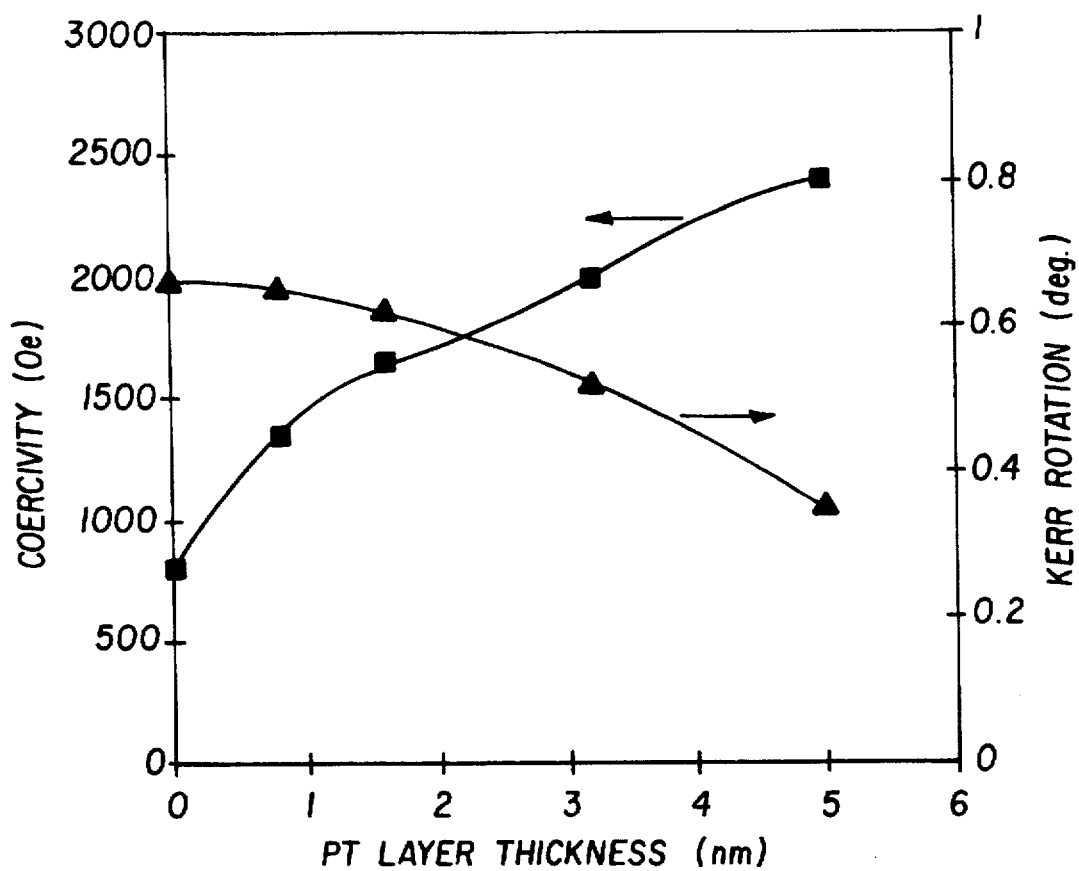
FIG. 4 shows coercivity and Kerr rotation as a function of Pt layer thickness in the duplex seed layer.

Turning now to FIG. 4, we see coercivity and Kerr rotations of a 12 bilayers Co/Pt multilayers deposited on the a duplex seed layer which have a ITO bottom layer of 30 nm and various thicknesses of Pt in the metal layer. As shown with increasing thickness of Pt, the coercivity increases. But the Kerr rotation decreases which limits the thickness of the top metal layer of the duplex seed layer. From this graph it is clear that the preferred range for the thickness of the metal layer is from 0.2–3.2 nm. By having this thickness and having the amorphous ITO layer 12A made of a thickness greater than 20 nm but less than 200 nm, the coercivity, squareness, and Kerr rotation of the Kerr hysteresis loop, reflectivity, and writing sensitivity can be improved.

Figure 5:
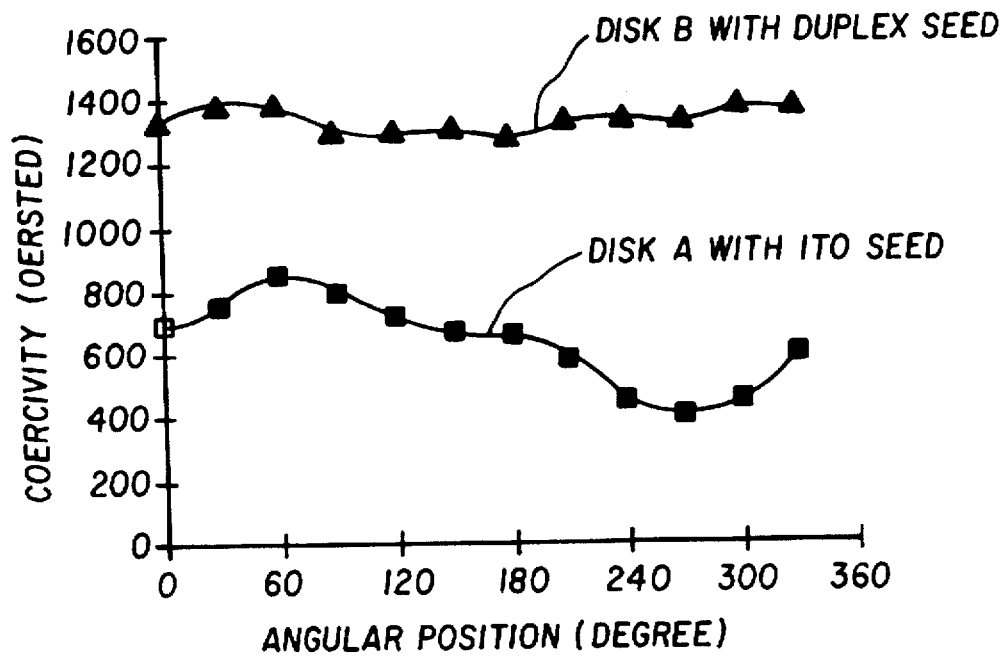
FIG. 5 shows the in-track uniformity in the coercivity at different angular positions of the two disks with and without a duplex seed layer.

Turning now to FIG. 5, we see coercivity measured at various angular positions of the two disks A and B. Disk A was prepared by depositing 12 bilayers of Co 0.25 nm/Pt 0.7 nm on a single seed layer of ITO. Similarly, disk B was prepared using a duplex seed layer of 40 nm of ITO and 1 nm of Pt in accordance with the present invention. As we see for the disk B, it has a much higher and uniform coercivity compared to disk A. This is a major advantage of using the duplex seed.

Garcia in U.S. Pat. No. 5,082,749 (see also Dielectric Enhancement Layers for a Pt/Co Multilayer Magneto-Optical Recording Medium, Carcia et al. 191, Appl. Phys. Lett. 58 (2) 1991, pages 191–193) uses c-axis oriented crystalline seed layers (see Carcia U.S. Pat. No. 5,082,749, column 5, lines 56–57). Carcia discussed the use of ZnO, AlN, $SnO_2$ and ITO but he also indicated that the amorphous material will not work. Carcia has described that because ZnO is crystalline, Zn and O atoms in the hexagonal planes of ZnO closely line up with Pt atoms of the close packed (111) fcc planes of the Co/Pt multilayer structure. This clearly means that only crystalline material will give seeding effect for the coercivity enhancement and amorphous material (where crystallinity is absent) will not give seeding effect. Thus crystalline materials will behave differently than the amorphous layers.

Figure 6:
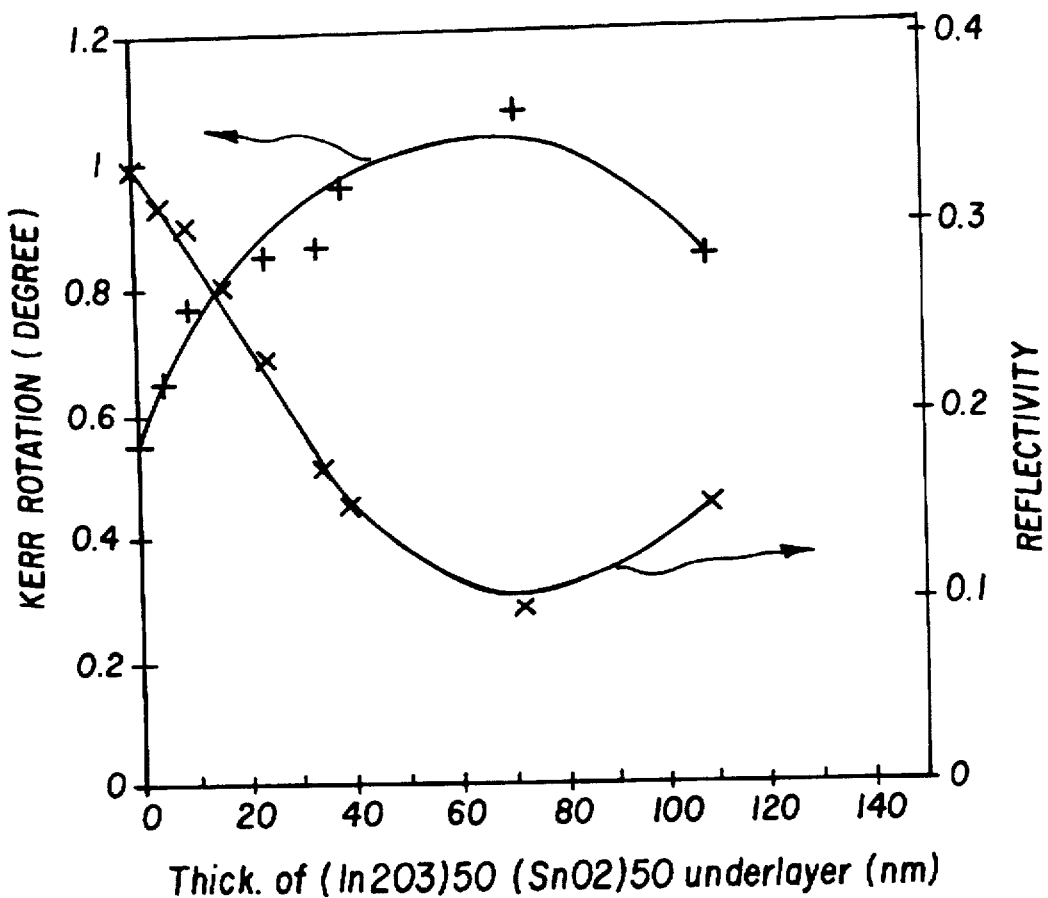
FIG. 6 is a plot showing Kerr rotation versus thickness for a $(In_2O_3)50(SnO_2)50$ layer in the duplex seed layer.

FIG. 6 shows the Kerr rotation and reflectivity of the Co/Pt multilayer disk with varying thickness of ITO seed layer. In this case, a duplex seed layer was prepared by varying the thickness of $(In_2O_3)50(SnO_2)50$ layer 12A and 0.8 nm of Pt metal layer 12B, followed by 12 bilayers of Co 0.25 nm/Pt 0.8 nm multilayer. It shows that Kerr rotation increases with increasing ITO thickness and reaches a maximum at about 70 nm, and then starts decreasing. The opposite behavior is shown by the reflectivity. Thus, Kerr rotation, reflectivity, and the writing sensitivity of the multilayer disk can be optimized by properly selecting the thickness of the ITO seed layer.

It is important to note that the ITO layers of the duplex seed layer should be amorphous to obtain a significant enhancement not only in the coercivity but in the squareness of the Kerr loop of the Co/Pt multilayer. Thick crystalline seed layers may achieve coercivity enhancement but do not achieve good squareness. For example, 100 nm thick $In_2O_3$, which is crystalline when prepared in Ar or Ar+1% $O_2$ atmosphere as seen by x-ray diffraction patterns, shows a significant enhancement in the coercivity of the Co/Pt multilayer, but the recording noise level is very high.

X-ray diffraction patterns for the Co/Pt structure without a seed layer and with a duplex seed layer deposited on glass substrate were obtained. The intensity of the main Co/Pt (111) peak was much higher than that without any seed layer. These results indicate that duplex seed layer improves the ordering of the multilayer structures. Similar results were obtained from the low angle x-ray diffraction patterns and indicated that the flatness of the structure surface and layer interfaces are improved with a seed layer. Atomic force microscopy (AFM) study showed very smooth surfaces for both the structures, but the surface roughness was higher for the structure without a seed layer.

Several full structure disks were prepared by depositing Co/Pt multilayer with or without duplex layers on 5.25" dia. polycarbonate and glass substrates. These disks were tested for dynamic performance. The comparison reveals that significantly lower noise and a higher CNR is obtained in the MO structure with an amorphous ITO seed layer.

Figure 7:
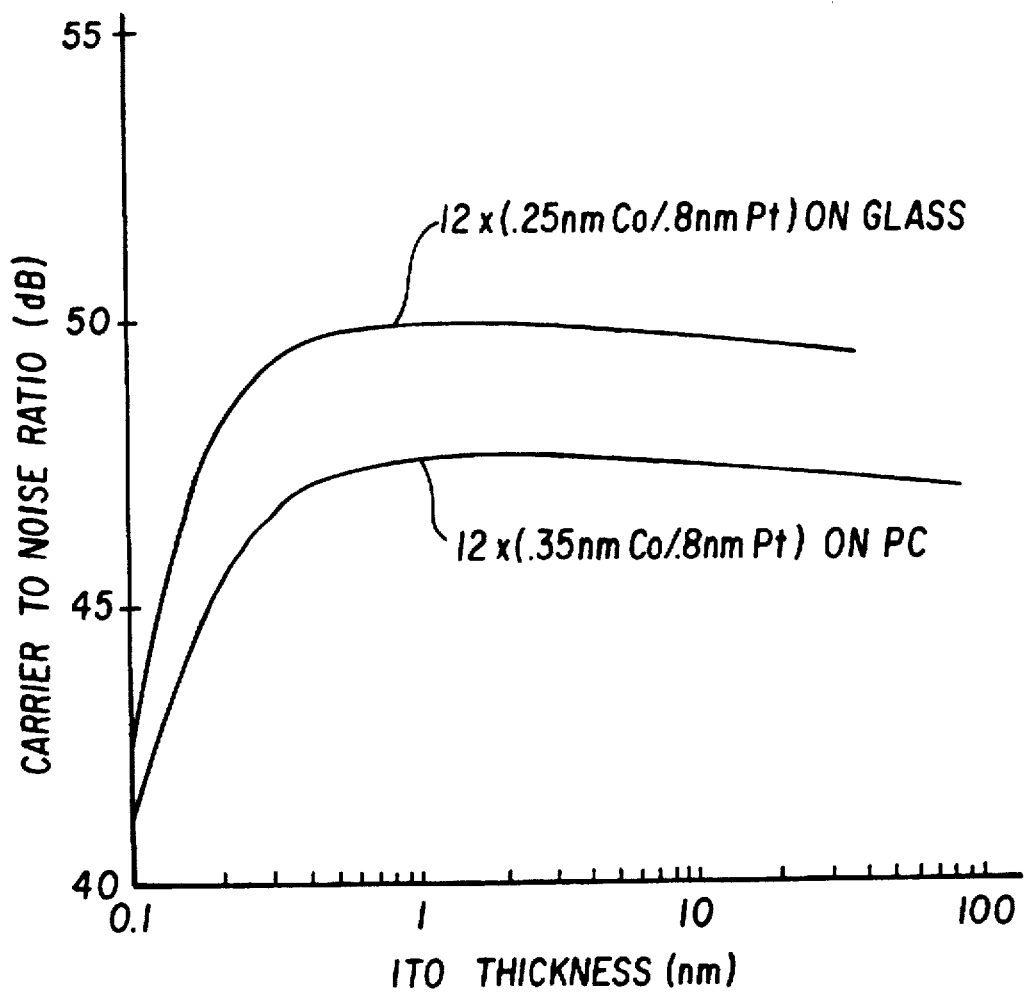
FIG. 7 is a plot showing the carrier to noise ratios for various Co/Pt ratios as a function of ITO layer thickness in the duplex seed layer.

FIG. 7 shows the CNR as a function of duplex seed layer thickness. Disks were prepared by depositing 12 bilayers of Co and Pt on a duplex seed layer made of varying thickness of amorphous ITO layer 12A and 1 nm of Pt metal layer 12B. Significant improvement in the carrier to noise ratio (CNR) of the Co/Pt multilayer disk is obtained using the duplex seed layer.

Figure 8:
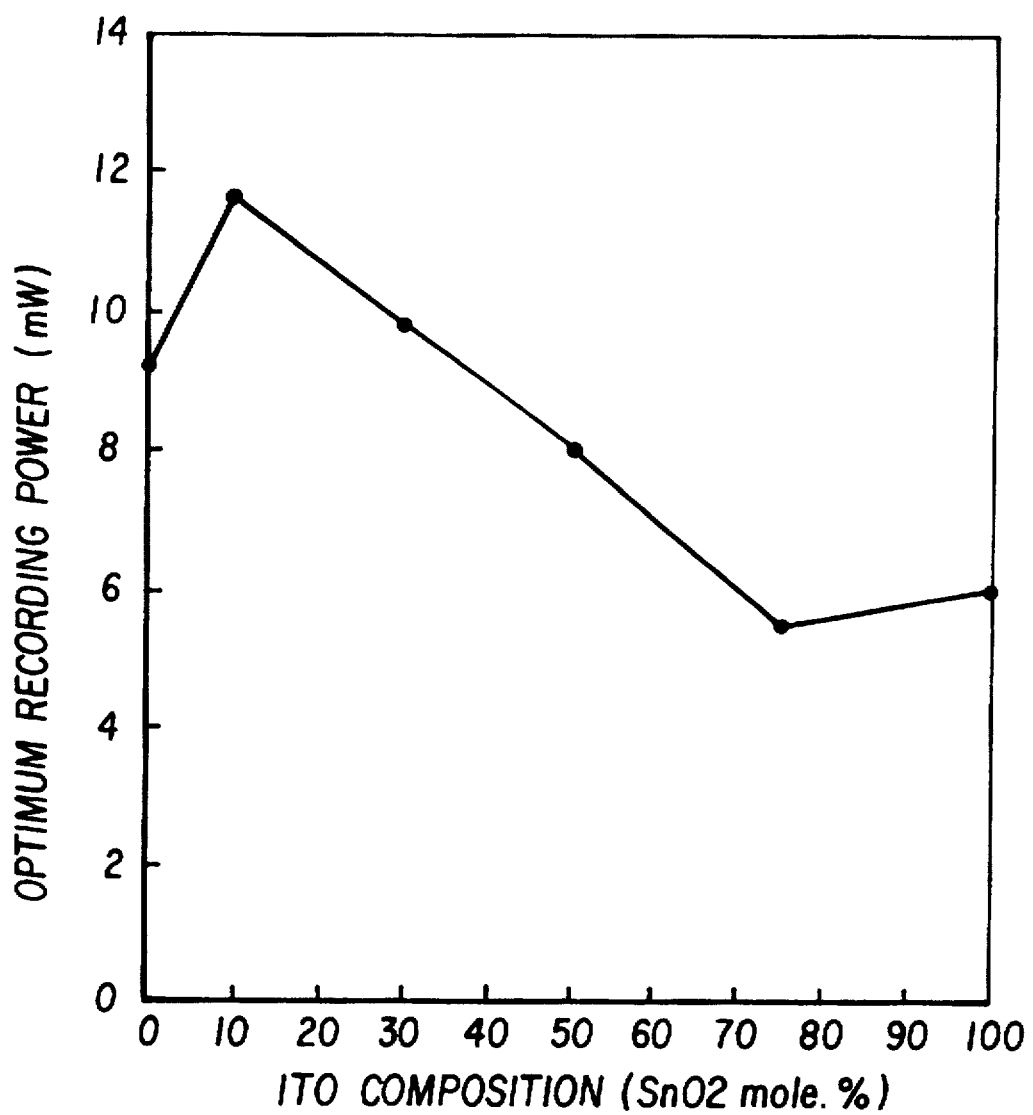
FIG. 8 is a plot of optimum recording power using ITO layers of different composition in the duplex seed layer.

Significant differences are observed in the writing sensitivity of the disk with various ITO compositions. FIG. 8 shows the optimum recording power (ORP) for the disk as a function of ITO layer 12A composition. The thickness of the duplex seed layer is about 80 nm of ITO and 1 nm of Pt in all the disks. The sensitivity of the disk is much higher for the underlayer having high $SnO_2$ content. The disks with $(In_2O_3)25(SnO_2)75$ layer had the lowest ORP and the highest maximum sensitivity. In fact, a two fold increase in recording sensitivity was observed as $SnO_2$ content is increased from 0 to 75%. This behavior was correlated to the composition induced changes in the microstructure and thermal conductivity of the ITO underlayer. ITO underlayer acts as a thermal barrier between the substrate and the Co/Pt recording multilayer. The reduction in crystallinity with increasing $SnO_2$ content decreases the ITO thermal conductivity, thus increasing its effectiveness as a thermal barrier, which results in the increase in recording sensitivity.

The MO structure was prepared in accordance with FIG. 1 which includes a UV cured lacquer overlayer 18. An example of such a lacquer is "Daicure Clear SD-17", a UV curable acrylic resin available from Dainippon Ink and Chemicals, Inc. The lacquer is typically applied by a spin coating technique and cured in the presence of UV light. This arrangement improves stability of the Co/Pt multilayer media. We found that even though Co/Pt multilayers have good chemical (corrosion and oxidation resistance) and thermal stability, they do not have good mechanical durability. We also observed the degradation of carrier level and increase in the bit error rate (BER) by repetitive write/erase process. This was ascribed to the deformation or delamination of the multilayer structure from the substrate surface. For putting Co/Pt multilayer media into a practical applications, we improved mechanical durability of these structures by overcoating the MO structure with a protective layer of UV-cured organic lacquer layer about 5–30 μm thick by spin coating method.

The invention has been described in detail with particular reference to certain preferred embodiments thereof, but it will be understood that variations and modifications can be effected within the spirit and scope of the invention.

| PARTS LIST | |
|---|---|
| 10 | substrate |
| 12 | duplex seed layer |
| 12A | ITO bottom layer |
| 12B | metal top layer |
| 13 | Pt layer |
| 14 | Co layer |
| 15 | multilayer recording element |
| 18 | lacquer overcoat layer |
| 20 | dielectric layer |
| 22 | metal layer |

We claim:

1. A magnetooptical recording medium comprising a substrate, a seed layer structure having at least two layers including a first layer formed on the substrate and consisting of amorphous ITO and having a thickness of greater than 20 nm but less than 200 nm; and a polycrystalline metal layer formed directly on the first layer having a thickness of 0.2–3.2 nm and a recording multilayer of alternate layers of platinum and cobalt or palladium and cobalt alloy deposited onto the said seed layer structure, whereby the said seed layer structure is selected to improve the recording sensitivity, the coercivity and squareness of the recording multilayer.

2. The magnetooptical recording medium of claim 1 further includes a UV curable lacquer overcoat provided over the recording multilayer.

3. The magnetooptical recording medium of claim 1 further including a dielectric layer on the recording multilayer and a second metal layer provided on the dielectric layer and a UV curable lacquer overcoat provided on the metal layer.

4. The magnetooptic medium of claim 1 wherein said seed layer is $(In_2O_3)1-(SnO_2)x$ where x=0.21 to 0.90.

5. The magnetooptical recording medium of claim 1 wherein the metal layer is selected from the group consisting of Pt, Au, and Pd.

6. The magnetooptical recording medium of claim 1 wherein the metal layer is Pt.

7. The magnetooptical recording medium of claim 1 wherein said multilayer film contains 2–23 bilayers of Co and Pt, the Co layers have a thickness of from 0.2 to 0.8 nm and the Pt layers have a thickness from 0.4 to 1.8 nm.

* * * * *

UNITED STATES PATENT AND TRADEMARK OFFICE
CERTIFICATE OF CORRECTION

PATENT NO. : 5,783,301
DATED : July 21, 1998
INVENTOR(S) : Tukaram K. Hatwar, et al It is certified that error appears in the above-identified patent and that said Letters Patent is hereby corrected as shown below:

Column 8, line 13 -- $(In_2O_3)_{1-x}(SnO_2)_x$ --

Signed and Sealed this

Fifteenth Day of February, 2000

Attest:

Attesting Officer

Q. TODD DICKINSON

Commissioner of Patents and Trademarks